April 10, 1934.   F. LOFGREN   1,954,251
MILK CAN OPENING AND POURING ATTACHMENT
Filed June 29, 1932
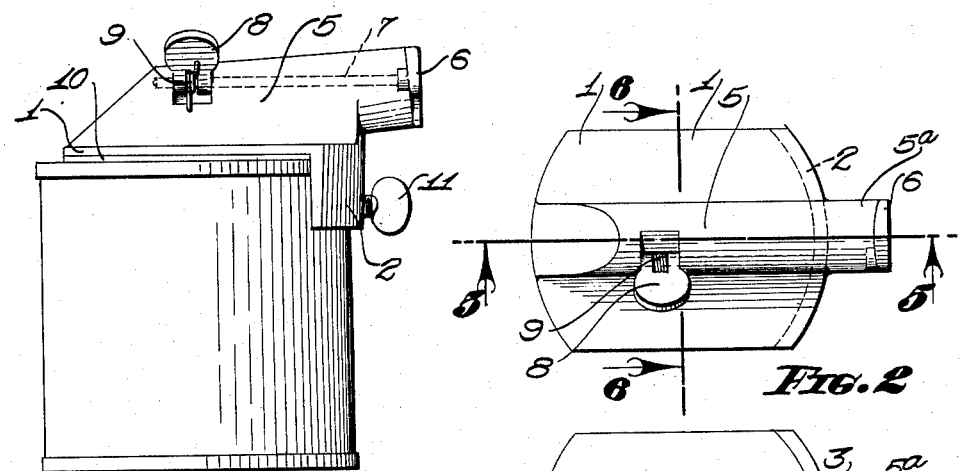
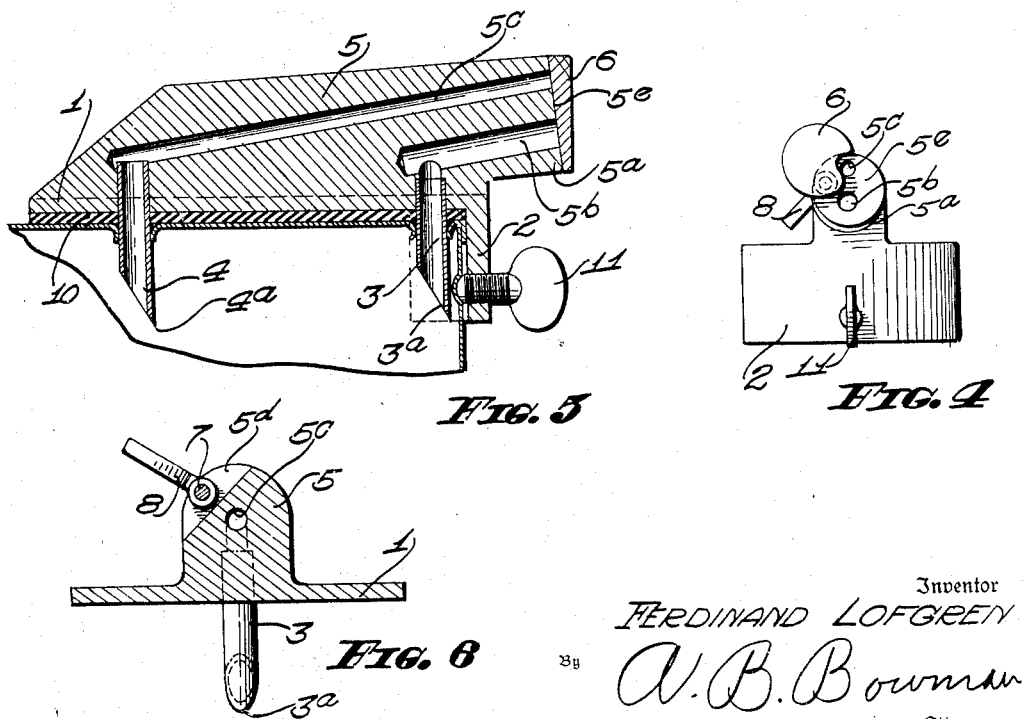
Inventor
FERDINAND LOFGREN
By A. B. Bowman
Attorney Patented Apr. 10, 1934

1,954,251

UNITED STATES PATENT OFFICE 1,954,251

MILK CAN OPENING AND POURING ATTACHMENT

Ferdinand Lofgren, San Diego, Calif.

Application June 29, 1932, Serial No. 619,856

5 Claims. (Cl. 221—23)

My invention relates to milk can opening and pouring attachments, and the objects of my invention are:

First, to provide an attachment of this class which may be easily and quickly secured to a milk can without the aid of tools;

Second, to provide an attachment of this class which prevents the formation of dried films of milk over the discharge openings;

Third, to provide an attachment of this class which automatically punctures the can when being installed thereon so that both the opening of the can and installing of the attachment is accomplished in one operation;

Fourth, to provide an attachment of this class which facilitates the handling of the milk can;

Fifth, to provide an attachment of this class which incorporates a novel gate and operating means therefor adapted to seal the openings in the attachment when not in use, the operating means being actuated by one hand while holding the can of milk, and Sixth, to provide on the whole a novelly constructed milk can opening and pouring attachment which is simple of construction proportional to its functions, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a side elevational view of my attachment shown in position on a milk can; Fig. 2 is a plan view thereof; Fig. 3 is a bottom view thereof; Fig. 4 is an end elevational view thereof showing the gate member swung away so as to permit pouring from the can; Fig. 5 is an enlarged longitudinal sectional view thereof through 5—5 of Fig. 2 with parts and portions shown in elevation; and Fig. 6 is an enlarged transverse sectional view thereof through 6—6 of Fig. 2.

Similar characters of reference refer to similar parts and portions throughout the several views of the drawing.

Base portion 1, apron 2, punching tubes 3 and 4, body element 5, gate member 6, operating shaft 7, operating lever 8, spring 9, gasket 10, and thumb screw 11, constitute the principal parts and portions of my novel milk can opening and pouring attachment.

A flat base portion 1 is provided along one edge of which is formed a depending arcuate apron 2. The base portion 1 is adapted to rest upon the upper end of the milk can, while the apron 2 fits over the side thereof, as shown best in Figs. 1 and 5.

The base portion is provided with a pair of downwardly directed punching tubes 3 and 4. The tube 3 is located adjacent but in slightly spaced relation with the apron 2, while the punching tube 4 is in alinement therewith but near the opposite end of the base portion 1. The punching tubes are beveled at their lower ends forming pointed portions 3a and 4a, respectively, which are adapted to be forced into a milk can, as shown in Fig. 5.

The punching tubes 3 and 4 extend upwardly into a body element 5 which is integral with the base portion 1 and in the form of a relatively large centrally disposed ridge. The body element 5 includes a projecting portion 5a which extends beyond and over the apron 2. Within the body element there is provided two sloping bores 5b and 5c arranged one above the other and communicating, respectively, with the punching tubes 3 and 4, the bore 5b being arranged below the bore 5c. The bores intersect the projecting portion 5a of the body element and thereby form passages communicating with the interior of a milk can through the punching tubes 3 and 4.

The extended end of the projecting portion 5a intersected by the bores 5b and 5c is adapted to receive a gate member 6 which is rotatably mounted in eccentric relation with the bores upon an operating shaft 7. The shaft 7 extends through a journal opening therefor formed within the body element 5 and terminates near the end of the body element remote from the projecting portion 5a. Intermediate its ends the shaft 7 is exposed by a slot 5d cut in the body element. At this portion the operating shaft 7 is provided with an operating lever 8 which is secured thereto and adapted to be engaged by a thumb or finger. A spring 9 is associated with the shaft 7 in such a manner as to hold the gate member 6 in its closed position. In order that the gate member may readily seat upon the extended end of the projection 5a the surface, designated 5e, of said projecting portion is beveled slightly with respect to the axis of the shaft 7. The operating face of the gate member 6 is provided with a corresponding bevel, as shown best in Figs. 1 and 5. This arrangement not only permits proper seating of the gate member, but also makes it unnecessary for the gate member to be rotated more than to clear the bore 5b, inasmuch as such movement spaces the face of the gate member away from the face 5e so as to provide an outlet for the bore 5c.

The under side of the base portion 1 is provided with a gasket 10 which fits snugly around the projecting punching tubes 3 and 4, as shown best in Fig. 5.

After the punching tubes have been forced into a can of milk the attachment is secured by means of a thumb screw 11 which is mounted in the apron 2 and is adapted to be turned so as to engage the side of the can, as shown best in Fig. 5.

The attachment is installed by placing the base portion on top of a can with the apron overhanging the edge thereof, then pressing downwardly with the palm of the hand so as to force the tubes 3 and 4 into the can. The thumb screw 11 is then tightened. The attachment is then ready for use. The milk pours out of the bore 5b, while air enters the bore 5c, so as to provide a steady flow. The attachment can be handled by grasping the attachment itself or the sides of the can. In either case one of the fingers will be free to engage the lever 8 and move it downwardly so as to swing the gate 6 clear of the bores 5b and 5c.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a milk can opening and pouring attachment, a unitary body element arranged to fit upon and against the upper end of a milk can, a depending apron portion adapted to fit over the edge of said can, punching tubes depending from said body element and arranged to be forced into the top of said milk can, means carried by said apron portion for securing said body element with said punching tubes in their inserted relation with said can, passages in said body element communicating with said punching tubes, a gate carried by said body element for rotating across and closing the exposed ends of said passages, yieldable means tending to maintain said gate in its closed position, and means for shifting said gate against said yieldable means.

2. In a milk can opening and pouring attachment, a body element arranged to fit upon a milk can, a depending apron portion adapted to fit over the edge of said can, punching tubes depending from said body element and arranged to be forced into the top of said milk can, means carried by said apron for securing said body element with said punching tubes in their inserted relation with said can, a spout protruding from said body element and terminating in a substantially perpendicular plane surface, passages in said body element communicating with said punching tubes and the plane surface end of said spout, and a gate means arranged to traverse the end of said spout to open and close the exposed ends of said passages.

3. In a milk can opening and pouring attachment, a body element including an integral base portion arranged to rest upon the upper side of a milk can, an integral apron depending from one margin of said base portion, and an integral enlargement on said base portion protruding beyond said apron and forming a spout occupying a substantially perpendicular relation with said base portion, and a pair of punching tubes depending from said base portion, said enlargement provided with passages therein communicating with said punching tubes and intersecting the extremity of said spout.

4. In a milk can opening and pouring attachment, a body element including an integral base portion arranged to rest upon the upper side of a milk can, an integral apron depending from one margin of said base portion, and an integral enlargement on said base portion protruding beyond said apron and forming a spout occupying a substantially perpendicular relation with said base portion, a pair of punching tubes depending from said base portion, said enlargement provided with passages therein communicating with said punching tubes and intersecting the extremity of said spout, and a gate rotatably mounted at the extremity of said spout at one side of said pasages and arranged to close said passages.

5. In a milk can opening and pouring attachment, a body element including an integral base portion arranged to rest upon the upper side of a milk can, an integral apron depending from one margin of said base portion, and an integral enlargement on said base portion protruding beyond said apron and forming a spout occupying a substantially perpendicular relation with said base portion, a pair of punching tubes depending from said base portion, said enlargement provided with passages therein communicating with said punching tubes and intersecting the extremity of said spout, and a securing means extending through said apron and engageable with the side of said milk can, said securing means tending to shift said punching tubes laterally so as to clamp said can between said punching tubes and said securing means.

FERDINAND LOFGREN.